United States Patent
Yamamoto et al.

(10) Patent No.: US 6,965,467 B2
(45) Date of Patent: Nov. 15, 2005

(54) PARTICLES FOR DISPLAY DEVICE, IMAGE DISPLAY MEDIUM USING THE SAME, AND IMAGE FORMING DEVICE

(75) Inventors: Yasuo Yamamoto, Minamiashigara (JP); Satoshi Hiraoka, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/294,873

(22) Filed: Nov. 15, 2002

(65) Prior Publication Data

US 2003/0123127 A1 Jul. 3, 2003

(30) Foreign Application Priority Data

Dec. 12, 2001 (JP) ........................... 2001-378844
Aug. 22, 2002 (JP) ........................... 2002-241787

(51) Int. Cl.[7] ............................................. G02B 26/00
(52) U.S. Cl. ...................... 359/290; 359/296; 347/112; 347/153; 345/107
(58) Field of Search ........................ 359/296, 290; 347/112, 153, 111, 122, 151; 345/107, 85; 250/378; 348/383; 430/19, 32, 41; 399/158, 131

(56) References Cited

U.S. PATENT DOCUMENTS

| | | | | |
|---|---|---|---|---|
| 4,126,528 A | * | 11/1978 | Chiang | ........................ 359/296 |
| 6,373,461 B1 | * | 4/2002 | Hasegawa et al. | .......... 345/107 |
| 6,400,462 B1 | * | 6/2002 | Hille | .......................... 358/1.14 |
| 6,400,492 B1 | * | 6/2002 | Morita et al. | ............... 359/296 |
| 6,407,763 B1 | * | 6/2002 | Yamaguchi et al. | ........ 347/112 |
| 6,411,316 B1 | * | 6/2002 | Shigehiro et al. | ........... 347/112 |
| 6,524,153 B1 | * | 2/2003 | Ikeda et al. | .................... 445/24 |
| 2001/0024577 A1 | * | 9/2001 | Matsuura et al. | .............. 399/2 |
| 2003/0227665 A1 | * | 12/2003 | Kawai | ........................ 359/296 |

FOREIGN PATENT DOCUMENTS

JP      A 2001-312225      11/2001

OTHER PUBLICATIONS

Gugrae–Jo et al., "New Toner Display Device (I)", Japan Hardcopy, Ronbunshu, pp. 249–252, 1999.

* cited by examiner

Primary Examiner—Hung Xuan Dang
Assistant Examiner—Joseph Martinez
(74) Attorney, Agent, or Firm—Oliff & Berridge, PLC

(57) ABSTRACT

Provided are particles for use in a display device, in which particles cohesive force between the particles and a specific gravity are reduced, and an image display medium which can ensure a stable display image over a long period of time, and an image forming device. The particles for a display device are such that the cohesive force between the particles and the specific gravity are reduced. Further, the present invention can provide the image display medium, in which a driving voltage can be set to be low, and which can ensure a stable display image over a long period of time even if there are shocks from an exterior or static states over long periods and the image forming device utilizing this image display medium.

3 Claims, 10 Drawing Sheets the exterior and static states over long periods of time, the particles fall off from the substrate. In particular, when particles of a large specific gravity containing a color material whose mass is large are used, the falling off from the substrate becomes even worse due to the specific gravity and the cohesion between particles, and it is difficult to hold a stable display image.

PARTICLES FOR DISPLAY DEVICE, IMAGE DISPLAY MEDIUM USING THE SAME, AND IMAGE FORMING DEVICE

BACKGROUND OF THE INVENTION

1. Field of the Invention

The present invention relates to an image display medium at which repeated rewriting is possible, to particles for a display device used in the image display medium, and to an image forming device.

2. Description of the Related Art

Conventionally, display techniques such as twisting ball display (display by the rotation of particles which are painted two colors), electrophoresis, magnetic migration, thermally rewritable media, liquid crystal having a good memory property, and the like, have been proposed as image display media at which repeated rewriting is possible. These display techniques have an excellent memory property with respect to images, but have the problems that the display surface cannot display white color such as in the case of paper, and the contrast is low.

The following display technique has been proposed ("Japan Hardcopy" '99, Ronbunshu, pp. 249–252) as a display technique using a toner and overcoming the above-described problems: a conductive colored toner and white particles are filled between opposing electrode substrates, and charges are injected into the conductive colored toner via a charge transporting layer provided at the inner surface of the electrode of the non-display substrate. The conductive colored toner, in which the charges have been injected, is moved by the electric field between the electrode substrates, toward the display substrate which is positioned so as to oppose the non-display substrate. The conductive colored toner adheres to the inner side of the substrate at the display side, and an image is displayed by the contrast between the conductive colored toner and the white particles. In this display technique, the entire image display medium is structured by solid bodies, and the display technique is superior in that the display of white and black (color) can be switched by 100% in theory. However, in this technique, there exists conductive colored toner which does not contact the charge transporting layer provided at the inner surface of the electrode of the non-display substrate, and conductive colored toner which is isolated from the other conductive colored toner. Because charges are not injected into these conductive colored toner, these conductive colored toner randomly exist within the substrate without being moved by the electric field. Thus, there is the problem that the density contrast deteriorates.

In order to overcome such a problem, Japanese Patent Application Laid-Open (JP-A) No. 2001-312225 discloses an image display medium comprising a pair of substrates, and plural types of particle groups which have respectively different colors and different charging characteristics and which are filled between the substrates so as to be movable between the substrates due to an applied electric field. In accordance with this proposed technique, a high degree of whiteness and density contrast can be obtained. The particles proposed therein are structured such that the applied voltage needed to display a black-and-white image is several hundred volts, and by reducing the voltage, an increase in the degrees of freedom in designing the driving circuit is made possible.

However, decreasing the applied voltage used in driving results in the problem that the attraction between the sub-

SUMMARY OF THE INVENTION

The present invention overcomes the above-described drawbacks of the conventional art, and achieves the following objects. Namely, an object of the present invention is to provide particles for a display device in which the cohesive strength between particles and the specific gravity of the particles are reduced. Another object of the present invention is to provide an image display medium in which the driving voltage can be set to be low, and which can ensure a stable display image over a long period of time even if there are shocks from the exterior or static states over long periods of time, and to provide an image forming device using the image display medium.

The present inventors focused their attention on attenuating the cohesive strength between particles and the adhesion of fine particles having a large specific gravity to the surface of a substrate, and, as a result of their diligent research, found that, by improving these properties to appropriate levels, the above-described drawbacks could be overcome. The present inventors thereby arrived at the present invention.

The particles for a display device of the present invention have the property of being able to be charged positive or negative, and have color, and contain polymer particulates therein. Further, it is preferable that a portion of or all of the polymer particulates are hollow particles.

Polymer particulates, which have a relatively low specific gravity, are contained in the particles for a display device of the present invention, and the added amount of the color material which forms the color is reduced. It is thereby possible to reduce the specific gravity of the particles. In particular, by making the contained polymer particulates be hollow particles, the specific gravity can be set to be even lower.

It is preferable that the color material which makes the color appear is formed from a pigment having a color difference ($\Delta E^*ab$) of light resistance of no more than 2.0 and having a color difference ($\Delta E^*ab$) of heat resistance of no more than 2.0 at 130° C. or higher, as obtained on the basis of pigment testing method JIS K 5101. By using such a pigment, the range of applications of the particles for a display device can be broadened.

The image display medium of the present invention has: a pair of substrates disposed so as to face each other, and particle groups formed from at least two types of particles filled into a void between the pair of substrates, and at least one type of the at least two types of particles has a property of being able to be charged positive and at least one other type of the at least two types of particles has a property of being able to be charged negative, and the particles which are able to be charged positive and the particles which are able to be charged negative have respectively different colors, wherein at least one of the particles which are able to be charged positive and at least one of the particles which are able to be charged negative are particles for a display device comprising polymer particulates therein. It is preferable that a portion of or all of the polymer particulates are hollow particles. Moreover, it is preferable that the color material which makes the color appear is formed from a pigment having a color difference (ΔE*ab) of light resistance of no more than 2.0 and having a color difference (ΔE*ab) of heat resistance of no more than 2.0 at 130° C. or higher, as obtained on the basis of pigment testing method JIS K 5101.

In the present invention, it is important that the particles which can be charged positive and the particles which can be charged negative have respectively different colors, and that the specific gravity of at least one of the types of particles is low. Because the colors are different, it is possible to obtain a high contrast between the image regions, which are formed from the group of particles which can be charged positive, and the image regions, which are formed from the group of particles which can be charged negative. Moreover, by reducing the specific gravity of the particles, the adsorbency between the particles and the substrates can be increased. Thus, it is also possible to lower the driving voltage needed for image display. Further, it is possible to ensure a stable displayed image over a long period of time even if there are shocks from the exterior or if there are static states for long periods. In addition, by utilizing particles for a display device which contain a pigment having excellent light-resistance and heat-resistance, the image display medium of the present invention can be suitably used as, for example, a display using a backlighting system.

In the image display medium of the present invention, it is preferable that one of the particles which can be charged positive and the particles which can be charged negative are white. By making at least one of these types of particles white, the coloring strength of the other particles and the density contrast can be improved. Moreover, the white particles contain a color material, and it is preferable that the color material is titanium oxide. By using titanium oxide, in the range of wavelengths of visible light, a high concealability can be obtained, and the contrast can be improved even more. In addition, in light of the relationship between dispersability and concealability, it is preferable that the titanium oxide is formed from at lest two types of titanium oxide having respectively different particle diameters.

The image forming device of the present invention forms an image on an image display medium having a pair of substrates disposed so as to face each other, and particle groups formed from at least two types of particles filled into a void between the pair of substrates, and at least one type of the at least two types of particles has a property of being able to be charged positive and at least one other type of the at least two types of particles has a property of being able to be charged negative, and the particles which are able to be charged positive and the particles which are able to be charged negative have respectively different colors, and at least one of the particles which are able to be charged positive and the particles which are able to be charged negative are particles for a display device including polymer particulates therein, and the image forming device comprises: electric field generating means for generating an electric field corresponding to an image, between the pair of substrates.

DESCRIPTION OF THE PREFERRED EMBODIMENTS

Figure 1:
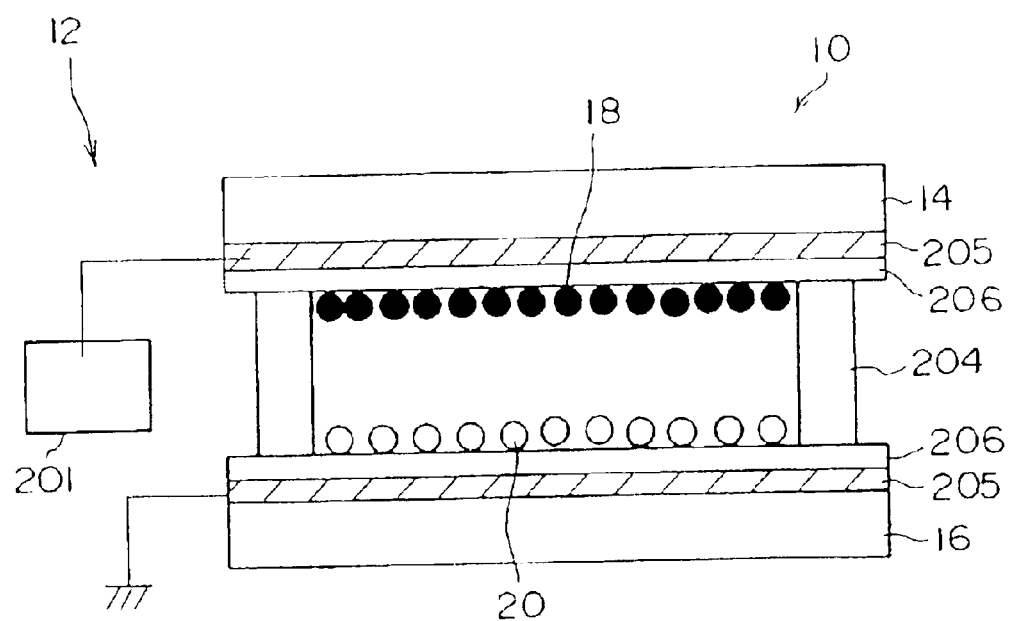
FIG. 1 is a schematic structural diagram of an image forming device of a first embodiment.

Hereinafter, detailed explanation will be given of the particles for a display device, the image display medium using the particles for a display device, and the image forming device, of the present invention.

[Structure of Particles for a Display Device of the Present Invention]

The particles for a display device of the present invention have the property of being able to be charged positive or negative, and have color, and polymer particulates must be contained therein.

The particles for a display device of the present invention are formed from at least polymer particulates, a color material, and a resin. As needed, a charge controlling agent may be included therein, or the color material may also function as a charge controlling agent.

Polymer particulates having a relatively low specific gravity are contained in the particles for a display device of the present invention, and the contained amount, in the particles for a display device of the present invention, of the color material which has a high specific gravity is reduced. The overall specific gravity of the particles for a display device can thereby be reduced. Namely, in the particles for a display device, by substituting a portion of the color material, which affects the specific gravity the most, with polymer particulates which have a low specific gravity, the overall specific gravity of the particles for a display device can be reduced.

In this way, the particles for a display device of the present invention have a reduced specific gravity, and the cohesiveness between the particles also can be reduced. Moreover, due to the scattering of light by the polymer particulates which are contained in the particles for a display device, the optical reflection density can be made to be high even if the contained amount of color material is reduced.

(Polymer Particulates)

Conventionally known polymers can be used as the polymer particulates. However, it is preferable to use polymer particulates whose specific gravity is lower than that of the color material with which they are used. Moreover, when the polymer particulates themselves have color, it is preferable to appropriately select and use the polymer particulates in consideration of the color of the color material with which they are used. In addition, although the resins which will be listed hereinafter can be used as the resin which is used together with the polymer particulates, methacrylate resins and acrylate resins are preferably used.

As the polymer particulates, specifically for example, polystyrene resin, polymethyl methacrylate resin, urea-formalin resin, styrene-acrylate resin, polyethylene resin, polyvinylidene fluoride resin and the like can be used singly or plural types thereof can be used in combination. However, the polymer particulates are not limited to these resins. These resins preferably have a cross-linked structure, and more preferably have a refractive index which is higher than that of the resin phase with which they are used.

Polymer particulates of any configuration, such as spherical, amorphous, flat, or the like, may be used. However, it is more preferable that the polymer particulates are spherical.

Polymer particulates may be used provided that their volume average particle diameter is less than that of the particles for a display device. However, the volume average particle diameter of the polymer particulates is preferably 10 μm or less, and more preferably 5 μm or less. It suffices for the particle size distribution to be sharp, and a monodisperse particle size distribution is particularly preferable.

From the standpoint of preparing the particles for a display device which have a lower specific gravity, a portion of or all of the polymer particulates are preferably formed from hollow particles. Although hollow particles can be used provided that their volume average particle diameter is less than that of the particles for a display device, the volume average particle diameter of the hollow particles is preferably 10 μm or less, and more preferably 5 μm or less. In particular, from the standpoint of scattering of light, the volume average particle diameter of the hollow particles is still more preferably 0.1 to 1 μm, and is particularly preferably 0.2 to 0.5 μm.

Here, "hollow particle" means a particle which has a void at the interior of the particle. The void is preferably 10 to 90%. Moreover, "hollow particles" may be particles in the form of a hollow capsule, or particles in which the outer wall of the particle is porous.

It is particularly preferable to include hollow particles in the white particles for a display device because they can improve the concealability and can increase the degree of whiteness by utilizing the scattering of light. In hollow particles which are in a hollow capsule form, this scattering of light is caused by the difference in the refractive indices at the interface between the resin layer at the outer shell portion and the air layer at the particle interior. In hollow particles whose outer wall is porous, the scattering of light is caused by the difference in refractive indices between the outer wall and the cavities.

In the particles for a display device of the present invention, the added amount of the polymer particulates is, with respect to the entire amount of the particles for a display device, preferably 1 to 40% by mass, and more preferably 1 to 20% by mass. If the added amount of the polymer particulates is less than 1% by mass, there are cases in which it is difficult for the effect of reducing the specific gravity by the addition of the polymer particulates to appear. Further, if the added amount of the polymer particulates is greater than 40% by mass, there are cases in which the manufacturability, such as the dispersability and the like, at the time of preparing the particles for a display device of a preferred form deteriorates.

(Color Material)

Examples of the color material are as follows.

Examples of black color materials are black color materials which are either organic or inorganic and are either a dye or a pigment, such as carbon black, titanium black, magnetic powder, oil black, and the like.

Examples of white color materials are white pigments such as rutile-type titanium oxide, anatase-type titanium oxide, zinc white, white lead, zinc sulfide, aluminum oxide, silicon oxide, zirconium oxide, and the like.

In addition, as color materials having chromatic colors, phthalocyanine-based, quinacridone-based, azo-based, and condensed-type insoluble lake pigments and dyes and pigments of inorganic oxides can be used. Specifically, aniline blue, chalcoil blue, chrome yellow, ultramarine blue, Dupont oil red, quinoline yellow, methylene blue chloride, phthalocyanine blue, malachite green oxalate, lamp black, rose bengal, C.I. Pigment Red48:1, C.I. Pigment Red 122, C.I. Pigment Red 57:1, C.I. Pigment Yellow 97, C.I. Pigment Blue 15:1, C.I. Pigment Blue 15:3 and the like can be suitably listed as representative examples.

These dyes and pigments may, as needed, be subjected to a surface treatment or the like for improving the dispersability thereof.

As a color material having a chromatic color, it is particularly preferable to use a pigment (which, for convenience, will hereinafter be called "specific pigment") whose color difference ($\Delta E^*ab$) of light resistance is 2.0 or less and whose color difference ($\Delta E^*ab$) of heat resistance is 2.0 or less at 130° C. or more, as obtained on the basis of pigment testing method JIS K 5101. As mentioned above, this specific pigment has high light resistance and heat resistance, which means that it does not discolor due to light or heat.

This specific pigment has the excellent advantage that, by dispersing the specific pigment extremely finely in order to obtain a high-level color rendering property, in applications such as, for example, displays using a backlighting method or the like, the desired transparency can be ensured and even more vivid color can be obtained as compared with generally used organic pigments such as paints or inks or the like.

Examples of the specific pigment which has a chromatic color are pigments used in color filters, and the like, such as blue pigments having a maximum absorption wavelength in the range of 400 nm to 500 nm, green pigments having a maximum absorption wavelength in the range of 500 nm to 600 nm, red pigments having a maximum absorption wavelength in the range of 600 nm to 700 nm, and the like. More specifically, examples of blue pigments are C.I. Pigment Blue 15 (15:3, 15:4, 15:6 and the like), 21, 22, 60, 64 and the like; examples of green pigments are C.I. Pigment Green 7, 10, 36, 47, and the like; and examples of red pigments are C.I. Pigment Red 9, 97, 122, 123, 144, 149, 166, 168, 177, 180, 192, 215, 216, 224 and the like.

The specific pigment is preferably used as a master batch pigment. Here, "master batch" means a preliminary mixture for a final molded product (in the present invention, the particles for a display device), which mixture has been conceived of in order to improve the economy of compounding of the color material, the dispersion of the color material, and the uniformity of the color material, as well as improve the ease of injection molding, extrusion molding, measurement, and the like. The master batch is formed by mixing, at a high concentration (usually 5 to 50% by mass) a pigment having a desired color into a raw material resin, and kneading the mixture, and working the mixture into the form of pellets (or into the form of flakes or into a plate-like form).

Examples of the raw material resin used in the master batch pigment are homopolymers and copolymers of radically polymerizable monomers such as styrene, methylstyrene, chlorostyrene, vinyl acetate, vinyl propionate, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, acrylonitrile, methacrylonitrile, acrylamide, methacrylamide, glycidyl acrylate, glycidyl methacrylate, acrylic acid, methacrylic acid, 2-vinylpyridine, and the like, as well as polyester resin, polyamide resin, epoxy resin, and the like.

The method of manufacturing the master batch pigment is as follows. First, the special pigment and the raw material resin are ground and dispersed in an organic solvent so as to prepare a pigment dispersed liquid. Here, a medium stirring mill such as a sand mill, a ball mill, an attritor or the like can be used in the grinding/dispersing processing. The grinding/dispersing processing may be carried out either in batches or continuously. Thereafter, the organic solvent is removed from the pigment dispersed liquid. Then, grinding is carried out so as to manufacture a master batch pigment in which the specific pigment is uniformly dispersed in the raw material resin.

When the particles for a display device of the present invention are manufactured by using the master batch pigment obtained in this way, the master batch pigment is used in the form of being added to and dispersed in a monomer.

Examples of the color material which is also used as the charge controlling agent are substances which have a charge attracting group or a charge donating group, metal complexes, and the like. Specific examples include C.I. Pigment Violet 1, C.I. Pigment Violet 3, C.I. Pigment Violet 23, C.I. Pigment Black 1, and the like.

If the specific gravity of the color material is 1, the added amount of the color material is preferably in a range of 1 to 60% by mass, and more preferably in a range of 5 to 50% by mass, with respect to all of the particles.

Further, when the color material is the specific pigment, if the specific gravity of the color material is 1, the added amount of the color material is preferably in a range of 1 to 60% by mass, and more preferably in a range of 5 to 30% by mass, with respect to all of the particles.

(Resin)

Examples of the resin are polyvinyl resins such as polyolefin, polystyrene, acrylic resin, polyacrylonitrile, polyvinyl acetate, polyvinyl alcohol, vinyl chloride, polyvinyl butyral, and the like; vinyl chloride—vinyl acetate copolymer; styrene-acrylate copolymer; styrene silicon resins formed by organosiloxane bonds, and modified resins thereof; fluorine resins such as polytetrafluoroethylene, polyvinyl fluoride, and polyvinylidene fluoride; polyester, polyurethane, polycarbonate; amino resins; epoxy resins; and the like. A single one of these resins may be used or plural resins may be used by being mixed together. These resins maybe cross-linked. Moreover, known binder resins, which are known as main components in toners used in conventional electrophotographic methods, may be used without problem as the resin. In particular, its is preferable to use a resin containing a cross-linked component.

(Other Additives)

As needed, a charge controlling agent may be added to the particles for a display device of the present invention, in order to control the charge ability. Known charge controlling agents which are used in toner materials for electrophotography can be used as the charge controlling agent. Examples include cetyl pyridyl chloride, quaternary ammonium salts such as P-51 and P-52 (manufactured by Orient Chemical Industries, Ltd.) and the like, salicylic acid based metal complexes, phenol condensation products, tetraphenyl compounds, calixarene compounds, as well as metal oxide particulates and metal oxide particulates which are surface treated by various types of coupling agents.

The charge controlling agent is preferably colorless, or has low coloring strength, or is a color similar to the color of the overall particles in which the charge controlling agent is contained. By using a charge controlling agent which is colorless, or has low coloring strength, or is a color similar to the color of the overall particles in which the charge controlling agent is contained (i.e., is a color similar to the color of the color material contained in the particles), the impact on the hue of the selected particles can be lessened.

Here, "colorless" means not having color, and "low coloring strength" means that there is little effect on the color of the overall particles in which the charge controlling agent is contained. Further, "is a color similar to the color of the overall particles in which the charge controlling agent is contained", means that, although the charge controlling agent itself has a hue, it is the same color as or a similar color to the color of the overall particles in which the charge controlling agent is contained, and as a result, there is little effect on the color of the overall particles in which the charge controlling agent is contained. For example, in particles containing a white pigment as the color material, a white color charge controlling agent would fall under the scope of "is a color similar to the color of the overall particles in which the charge controlling agent is contained". In any case, regardless of whether the color of the charge controlling agent is "colorless", "low coloring strength", or "a color similar to the color of the overall particles in which the charge controlling agent is contained", it suffices that the color of the charge controlling agent is such that the color of the particles containing the charge controlling agent becomes the desired color.

The added amount of the charge controlling agent is preferably 0.1 to 10% by mass, and more preferably 0.5 to 5% by mass. Further, with regard to the size of the dispersed unit of the charge controlling agent within the particles, a volume average particle diameter of 5 $\mu$m or less is suitably used, and a volume average particle diameter of 1 $\mu$m or less is preferable. Moreover, the charge controlling agent may exist in a compatible state in the particles.

It is preferable to add a resistance adjusting agent to the particles for a display device of the present invention. By adding a resistance adjusting agent, the exchange of charges between particles can be made faster, and early stabilization of the display image can be achieved. Here, "resistance adjusting agent" means a conductive fine powder, and particularly preferably, a conductive fine powder which generates an appropriate level of exchange of charges or leakage of charges. By also including a resistance adjusting agent in the particles for a display device of the present invention, it is possible to avoid an increase in the amount of charge of the particles, i.e., so-called "charging-up", due to friction between the particles and friction between the particles and the surface of the substrate over a long period of time.

An appropriate example of the resistance adjusting agent is an inorganic fine powder whose volume resistivity is $10 \times 10^6$ $\Omega$cm or less, and preferably $10 \times 10^4$ $\Omega$cm or less. Specific examples include particulates coated with any of various types of conductive oxides such as tin oxide, titanium oxide, zinc oxide and iron oxide, such as, for example, titanium oxide coated with tin oxide and the like. It is preferable that the resistance adjusting agent is colorless, has low coloring strength, or is a color similar to the color of the overall particles in which the resistance adjusting agent is contained. The meanings of these terms are similar to those described above in the discussion of the charge controlling agent. The added amount of the resistance adjusting agent does not present problems provided that it is in the range of not interfering with the color of the colored particles, and an added amount of 0.1 to 10% by mass is preferable.

The particle diameter of the particles for a display device of the present invention cannot be stipulated unconditionally. However, in order to obtain a good image, the volume average particle diameter thereof is preferably about 1 to 100 μm and more preferably about 3 to 30 μm. It suffices for the particle size distribution thereof to be sharp, and a monodisperse particle size distribution is more preferable.

(Method of Manufacturing Particles for Display Device)

Examples of methods of manufacturing the particles for a display device of the present invention are wet manufacturing methods which manufacture spherical particles, such as suspension polymerization, emulsion polymerization, dispersion polymerization and the like, and conventional grinding/classifying methods which manufacture non-uniformly-shaped particles. Further, in order to obtain a uniform shape of the particles, a heat treatment can also suitably be carried out.

As a method of making the particle size distribution uniform, the particle size distribution can be adjusted by classifying. This can be carried out by, for example, a vibrating sieve, an ultrasonic sieve, a pneumatic sieve, a wet sieve, rotor rotary-type classifying devices using the principles of centrifugal force, wind power based classifying devices, and the like. However, the present invention is not limited to the same. The particle size distribution can be adjusted to the desired particle size distribution with a single device, or by combining plural devices. In a case in which particularly precise adjustment is to be carried out, it is preferable to use a wet sieve.

The following is a suitable example of a method of controlling the shape of the particles (a method of controlling the shape factor). A so-called suspension polymerization method is a method in which a polymer is dissolved in a solvent, and a colorant is mixed in, and in the presence of an inorganic dispersing agent, the mixture is dispersed in a water-based solvent such that particles are formed. In this suspension polymerization method, an organic solvent, which is compatible with a monomer (i.e., has no or little compatibility with a solvent) and is not polymerizable, is added and suspension polymerization is carried out. Examples of a method can be suitably given, which method suitably selects a drying method for removing the organic solvent by steps of forming, removing and drying the particles. A freeze-drying method disclosed in JP-A No. 10-10775 is a suitable example of the method of appropriately selecting a drying method for removing the organic solvent. The freeze-drying method is preferably carried out at −10° C. to −200° C. (preferably, −30° C. to −180° C.). Further, the freeze-drying method is carried out at a pressure of around 40 Pa or less, and is particularly preferably carried out at 13 Pa or less. Here, examples of the organic solvent are ester solvents such as methyl acetate, propyl acetate and the like; ether solvents such as diethylether; ketone solvents such as methylethyl ketone, methylisopropyl ketone, methylisobutyl ketone, and the like; hydrocarbon solvents such as toluene, cyclohexane and the like; halogenated hydrocarbon solvents such as dichloromethane, chloroform, trichloroethylene, and the like; and the like. It is preferable that these solvents can dissolve polymers, or that the proportion which dissolves in water is about 0 to 30% by mass. Further, in carrying out the method on an industrial scale, cyclohexane is particularly preferable in consideration of the stability, cost, and produceability.

Further, the particle shape can also be controlled by the method disclosed in JP-A No. 2000-292971 of making small particles cohere and unite so as to enlarge the small particles to a desired particle diameter, or a method of heating or a method of applying mechanical impact force (e.g., by a hybridizer (manufactured by Nara Machinery Co., Ltd.), an ang mill (manufactured by Hosokawa Micron Corporation), a θ composer (manufactured by Tokuju Corporation), or the like) to particles obtained by conventionally known fusing/kneading, grinding, classifying and other methods, or the like.

[Structure of Image Display Medium of the Present Invention]

The image display medium of the present invention comprises a pair of substrates which are disposed so as to oppose one another, and particle groups formed from at least two or more types of particles filled into the void between the pair of substrates. Of the two or more types of particles, at least one type has the property of being able to be charged positive, and at least one another type has the property of being able to be charged negative. The particles which can be charged positive and the particles which can be charged negative have respectively different colors. At least one of the particles which can be charged positive and the particles which can be charged negative are the above-described particles for a display device of the present invention.

(Particle Groups Formed From Two or More Types of Particles)

The particle groups of the present invention which are formed from two or more types of particles have the feature that, in the particle groups, at least one type of particles (first particles) has the property of being able to be charged positive, and at least one another type of particles (second particles) has the property of being able to be charged negative, and the particles able to be charged positive and the particles able to be charged negative have respectively different colors.

In the image display medium of the present invention, the previously-mentioned problems can be overcome by reducing the specific gravity of the particles of at least one of the first particles and the second particles. Namely, in the image display medium of the present invention, by using, as the particles of at least one of the first particles and the second particles, the particles for a display device of the present invention whose specific gravity has been reduced, the cohesiveness between particles and the peeling away from the substrate can be reduced, and a stable display image can be maintained. Accordingly, at the image display medium of the present invention, the driving voltage can be set to be low, and even if there are shocks from the exterior or static states for long periods of time, a stable display image can be ensured over a long period of time.

Note that, in the above description, expression were used which were based on the assumption that there was one type of particles charged positive (the first particles) and one type of particles charged negative (the second particles). However, there are no problems if there is only one type of each of positively charged particles and negatively charged particles, or if there are two or more types of each. Even when there are two or more types of each, if one type there among is formed by the particles for a display device of the present invention, the effects of the present invention due to operational mechanisms which are the same as those described above can be achieved.

Hereinafter, in the image display medium of the present invention, the first particles and the second particles together, i.e., both of the particles which can be charged positive and the particles which can be charged negative, will collectively be called the "display particles". Both of these display particles are preferably structured by the above-described particles for a display device of the present invention. However, as will be described hereinafter, conventionally known particles, which do not contain polymer particulates therein, can also be used together.

Particles, which are formed from at least a color material and a resin and whose color material and resin are the same as those of the above-described particles for a display device of the present invention, can be used as the conventionally known particles which can be used together. Further, in the same way as described above, these particles may, as needed, contain a charge controlling agent, and the color material may also serve as the charge controlling agent.

In the image display medium of the present invention, it is preferable that one type of the display particles is white, i.e., it is preferable that one type of the display particles contains a white color material. By making one type of the particles white, the coloring strength of the other type of particles and the density contrast can be improved. Here, titanium oxide is preferable as the white color material for making one type of particles white. By using titanium oxide as the color material, in the range of wavelengths of visible light, the concealing force increases, and the density contrast can be improved even more. Rutile-type titanium oxide is particularly preferable as the white color material.

It is preferable that the titanium oxide used in the present invention is two or more types of titanium oxides having respectively different particle diameters. Generally, the dispersability of titanium oxide is poor. Even if the dispersability is improved, with those titanium oxide particles whose diameters are large, the occurrence of secondary and tertiary cohesion is more rapid, the dispersion stability deteriorates, and there are cases in which the concealing force cannot be sufficiently exhibited, all in accordance with the larger specific gravity of such larger-diameter titanium oxide particles. On the other hand, those titanium oxide particles whose particle diameters are small cannot sufficiently cause scattering of light, and there are cases in which the concealing force is poor. Accordingly, by using in combination two or more types of titanium oxides having different average particle diameters, both dispersion stability and concealability can be improved.

The primary particle diameter of at least one type of titanium oxide which can be used is preferably 0.1 $\mu$m to 1.0 $\mu$m which is a particle diameter which results in high optical concealability. The primary particle diameter of the other titanium oxide is preferably less than 0.1 $\mu$m.

The titanium oxide which has the small particle diameter may be subjected to a surface treatment. Substances in which any of various types of coupling agents or organic substances is dissolved in a solvent can be used as the surface treating agent, provided that it is in the range of not affecting the degree of whiteness.

Here, because the specific gravity of white color display particles containing titanium oxide is particularly large as compared with that of the display particles having other color materials, it is particularly preferable that the above-described particles for a display device of the present invention are used as the display particles. Further, by making the polymer particulates included in the particles for a display device be hollow particles, the degree of whiteness can be increased and better contrast can be expected.

Note that, in the present invention, one type of display particles is not limited to being white. For example, one type of display particles may be black. In this case, for example, it is particularly effective to carry out display by switching between a character or symbol which is black and a character or a symbol which is another color.

It is necessary to prepare the display particles such that one type thereof has the property of being able to be charged positive and another type thereof has the property of being able to be charged negative. When different types of particles are charged by colliding and being rubbed, one type is charged positive and another type is charged negative due to the positional relationship of both tribo series. Thus, for example, by appropriately selecting the charge controlling agent, the positions of the tribo series can be appropriately adjusted.

With regard to the particle size of the display particles, by making the particle diameters and the distributions of the white particles and the black particles substantially the same for example, it is possible to avoid a so-called adhered state in which the larger particle diameter particles are surrounded by the smaller particle diameter particles as in the case of a two-component developer. Thus, a high white density and a high black density can be obtained. The coefficient of variation is preferably about 15% or less, and monodisperse is particularly preferable. There are cases in which small particle diameter particles adhere to the peripheries of large particle diameter particles, and the inherent color density of the large particles decreases. Further, there are cases in which the contrast varies also due to the mixing ratio of the white and black particles. The mixing proportion is preferably of an extent such that the display surface areas of the display particles are equivalent. If the mixing proportion deviates greatly from such a mixing proportion, the color of the particles whose proportion is greater may be stronger. However, this does not apply in a case in which it is desired to increase the contrast in a display of a darker color tone and the display of a lighter color tone of the same color, or in a case in which it is desired to carry out display in a color formed by mixing together two types of colored particles.

(Substrate)

A pair of the substrates are disposed so as to oppose one another, and the display particles are filled into the void between the pair of substrates. In the present invention, the substrate is a conductive plate-shaped body (a conductive substrate). In order to achieve the functions of the image display medium, at least one of the pair of substrates must be a transparent conductive substrate. Here, the transparent conductive substrate is the display substrate.

The conductive substrate may be a structure in which the substrate itself is conductive, or may be a structure in which the surface of an insulating support is subjected to a processing for making it conductive. The conductive substrate may be either crystal or non-crystal. Examples of conductive substrates in which the substrates themselves are conductive are metals such as aluminum, stainless steel, nickel, chromium or the like and alloys thereof, and semiconductors such as Si, GaAs, GaP, GaN, SiC, ZnO and the like, and the like.

Examples of the material of the insulating support are polymer films, glass, quartz, ceramics and the like. The process for making the insulating support conductive can be carried out by forming a film by vapor depositing, spattering, ion plating or the like any of the metals which are listed above as specific examples of the material for the conductive substrate when the substrate itself is conductive, or gold, silver, copper, or the like.

A conductive substrate, at which a transparent electrode is formed on one surface of an insulating transparent support, or a transparent support, which itself is conductive, is used as the transparent conductive substrate. Examples of materials of transparent supports which are themselves conductive are transparent conductive materials such as ITO, zinc oxide, tin oxide, lead oxide, indium oxide, copper iodide, and the like.

Films or plate-shaped bodies of transparent inorganic materials such as glass, quartz, sapphire, MgO, LiF, $CaF_2$, and the like, or of transparent organic resins such as fluorine resins, polyester, polycarbonate, polyethylene, polyethylene terephthalate, epoxy and the like, can be used as the insulating transparent support. Or, an optical fiber, a Selfoc optical plate, or the like can be used as the insulating transparent support.

Structures which are formed by methods such as vapor deposition, ion plating, spattering and the like by using a transparent conductive material such as ITO, zinc oxide, tin oxide, lead oxide, indium oxide, copper iodide or the like, or structures in which a metal such as Al, Ni, Au or the like is formed thin enough to be semi-transparent by vapor deposition or spattering or the like, can be used as the transparent electrode provided on one surface of the transparent support.

The surfaces of these substrates at the sides which oppose one another affect the charged polarity of the particles. Thus, providing thereat a protective layer in the form of an appropriate surface is preferable. The protective layer can be appropriately selected mainly from the standpoints of adhesion to the substrate, transparency, and the electrode rows, as well as from the standpoint of the ability thereof to not dirty the surface. Specific examples of materials of the protective layer are polycarbonate resin, vinyl silicone resin, fluorine-group-containing resins, and the like. A resin, that is compatible with structure of the main monomer of the particles used and whose friction charging difference with the particles are small, is selected.

[Embodiments of the Image Forming Device of the Present Invention]

Hereinafter, embodiments of the image forming device of the present invention, which uses the image display medium of the present invention, will be described in detail with reference to the drawings. Note that members having similar functions are denoted by the same reference numerals throughout all of the figures, and there are cases in which description thereof will be omitted.

First Embodiment

FIG. 1 illustrates an image display medium relating to the present embodiment, and an image forming device, relating to the present embodiment, for forming an image on the image display medium.

As shown in FIG. 1, an image forming device 12 relating to the present first embodiment has a voltage applying means 201. An image display medium 10 is structured by spacers 204, black particles 18, and white particles 20 being filled in between a display substrate 14, which is at the side that the image is displayed, and a non-display substrate 16 which opposes the display substrate 14. As will be described layer, a transparent electrode 205 is attached to each of the display substrate 14 and the non-display substrate 16. The transparent electrode 205 of the non-display substrate 16 is grounded, whereas the transparent electrode 205 of the display substrate 14 is connected to the voltage applying means 201.

Next, details of the image display medium 10 will be described.

For example, 7059 glass substrates, to which 50×50×1.1 mm transparent electrode ITOs are attached, are used as the display substrate 14 and the non-display substrate 16 which form the outer sides of the image display medium 10. An inner side surface 206 of the glass substrate, which inner side surface 206 contacts the particles, is coated by a 5 µm thick polycarbonate resin (PC-Z). The center portions of the silicon rubber plates 204 which are 40×40×0.3 mm are each cut-out in a square of 15×15 mm so as to form a space, and these silicon rubber plates are set on the non-display substrate 16. For example, the white particulates 20, which are spherical and contain titanium oxide and have a volume average particle diameter of 20 µm, and the black particulates 18, which are spherical and contain carbon and have a volume average particle diameter of 20 µm, are mixed together in a mass ratio of 2-to-1. About 15 mg of these mixed particles are shaken through a screen into the spaces cut-out in squares in the silicon rubber plates. Thereafter, the silicon rubber plates are fit tightly to the display substrate 14. The region between the substrates is pressurized and held by double clips, such that the silicon rubber plates and the both substrates are tightly fit together and the image display medium 10 is formed.

Second Embodiment

Hereinafter, a second embodiment of the present invention will be described in detail with reference to the drawings.

Figure 2:
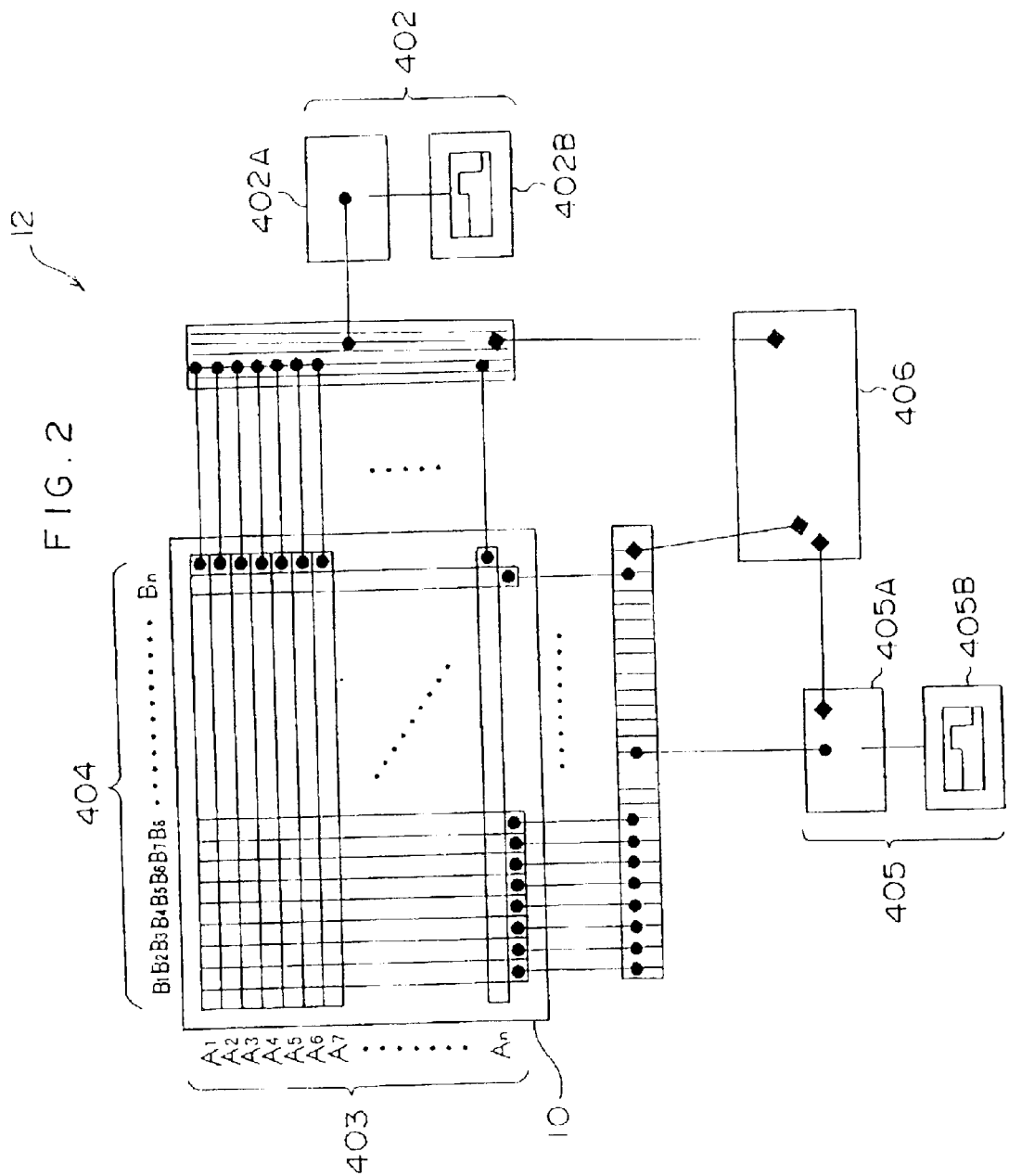
FIG. 2 is a schematic structural diagram of an image forming device of a second embodiment.

FIG. 2 illustrates an image forming device 12 which relates to the present embodiment and which is for forming an image on the image display medium 10 using a simple matrix. Electrodes 403An and 404Bn (where n is a positive number) are arranged in a simple matrix structure. A plurality of particle groups having different chargeabilities are filled into the spaces between the electrodes 403An, 404Bn. Electric potential is generated at the respective electrodes 403An, 404Bn by an electric field generating device 402 formed by a waveform generating device 402B and a power source 402A, or by an electric field generating device 405 formed by a waveform generating device 405B and a power source 405A. By a sequencer 406, the electric potential driving timing of the electrodes is controlled and the driving of the voltages of the respective electrodes is controlled. An electric field, by which the particles can be driven in units of one row, can be applied to the electrodes 403A1 through An of one surface, and an electric field corresponding to image information can simultaneously be applied within the surface to the electrodes B1 through Bn of the other surface.

Figure 3:
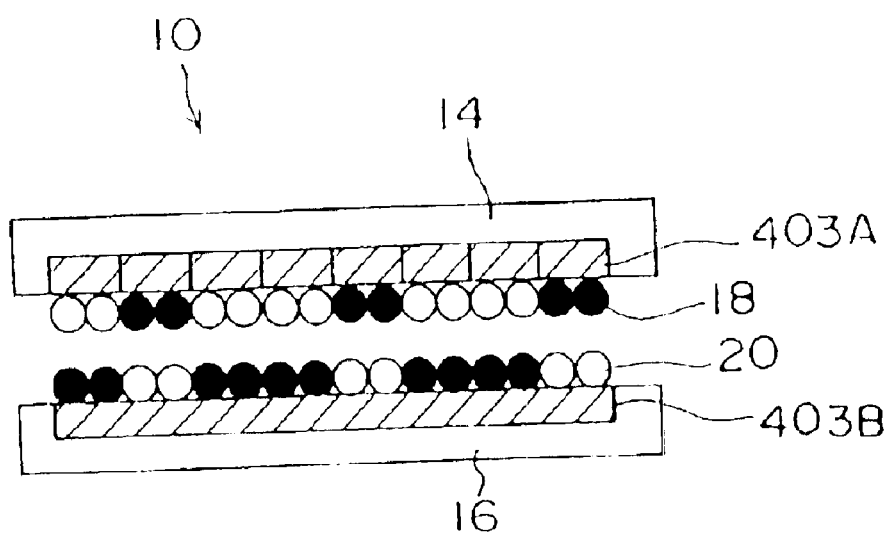
FIG. 3 is a cross-sectional view of an image forming portion in an arbitrary plane of FIG. 2.
Figure 4:
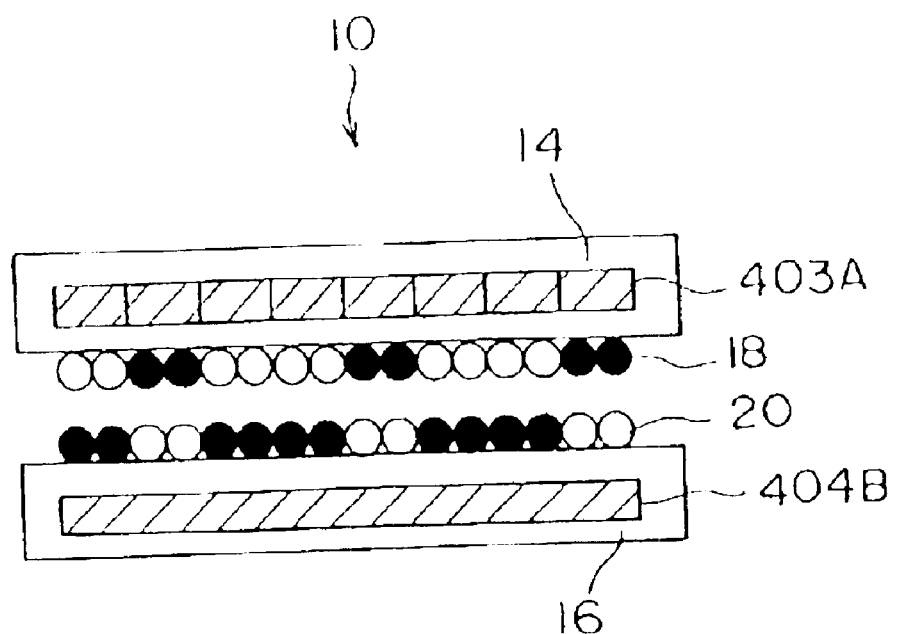
FIG. 4 is a cross-sectional view of an image forming portion in an arbitrary plane of FIG. 2.
Figure 5:
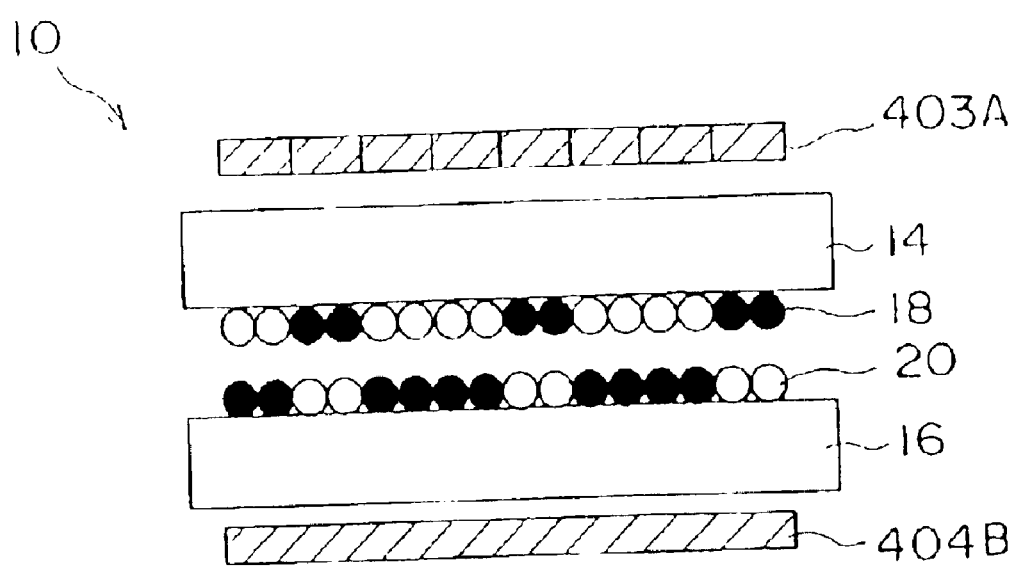
FIG. 5 is a cross-sectional view of an image forming portion in an arbitrary plane of FIG. 2.

FIGS. 3, 4, and 5 show cross-sections of the image forming portion in an arbitrary plane of FIG. 2. The particles are contacting the electrode surface or the substrate surface, and at least one surface of the substrate is transparent and the color of the particles passes through and can be seen from the exterior. The electrodes 403A, 404B may be embedded in and made integral with the substrate as shown in FIGS. 3 and 4, or may be formed to as to be set apart from the substrates as shown in FIG. 5.

By setting the electrical field appropriately in the above-described device, display in accordance with simple matrix driving is possible. Note that, provided that the particles have a threshold value of movement with respect to the electric field, driving is possible, and the colors, charged polarities, amounts of charge, and the like of the particles are not restricted.

Third Embodiment

Hereinafter, a third embodiment of the present invention will be described with reference to the drawings. The third embodiment is an image forming device using a printing electrode.

Figure 6:
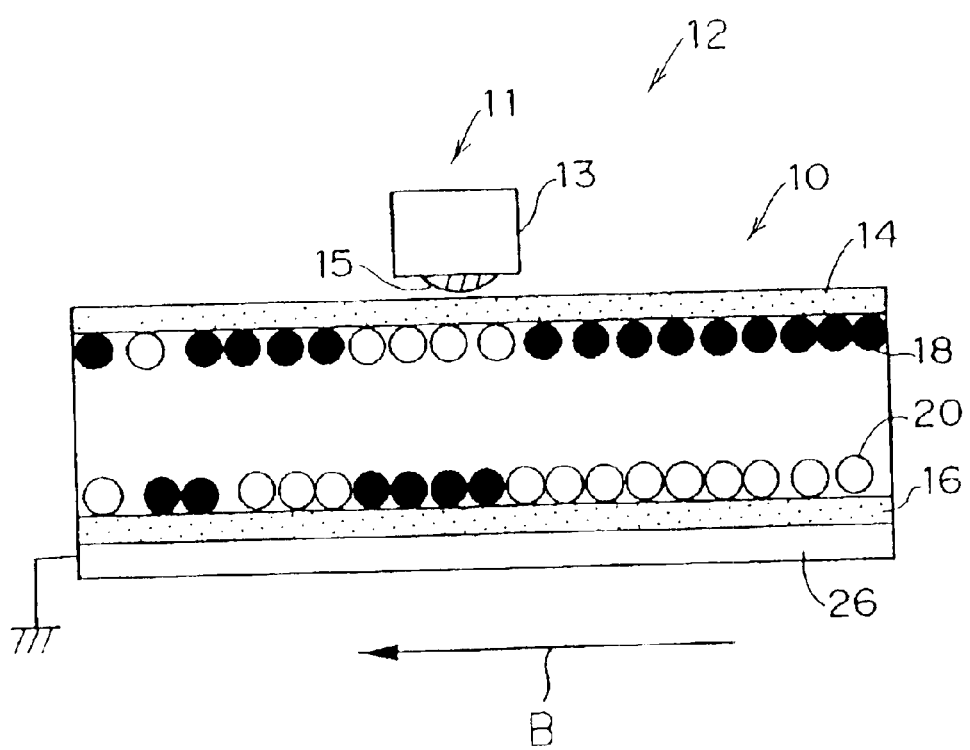
FIG. 6 is a schematic structural diagram of an image forming device of a third embodiment.
Figure 7C:
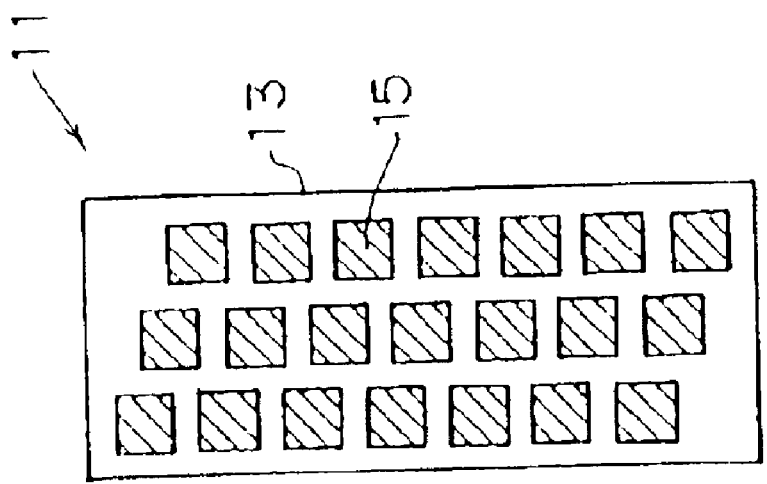
FIGS. 7A through 7C are diagrams showing patterns of electrodes of a printing electrode.
Figure 7B:
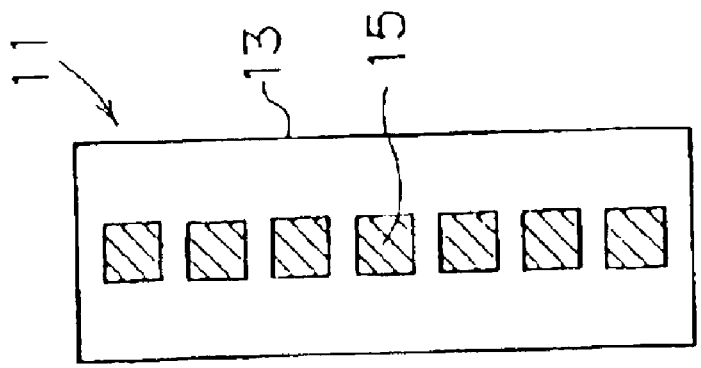
Figure 7A:
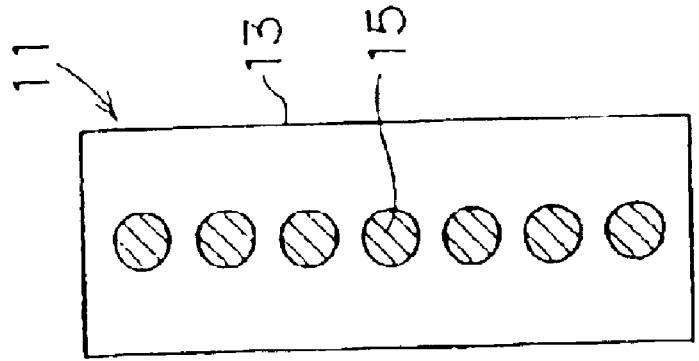

As shown in FIG. 6 and FIG. 7A, the printing electrode 11 is formed from a substrate 13 and a plurality of electrodes 15 whose diameter is, for example, 100 µm. The image forming device 12 is equipped with the printing electrode 11, an opposing electrode 26, a power source 28, and the like.

As shown in FIG. 7A, the plurality of electrodes 15 are aligned at one side surface of the display substrate 14 in one row at predetermined intervals in accordance with the resolution of the image and along a direction (the main scanning direction) substantially orthogonal to the conveying direction (the direction of arrow B in FIG. 6) of the image display medium 10. The electrodes 15 may be square as shown in FIG. 7B, or may be disposed in a matrix form as shown in FIG. 7C.

Figure 8:
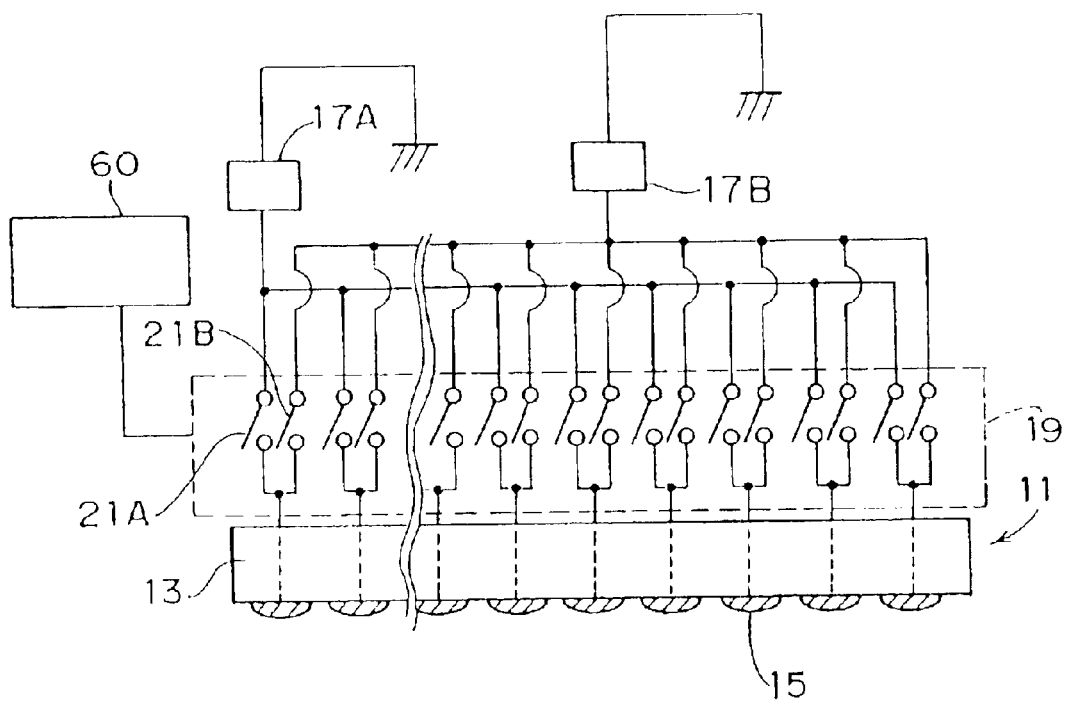
FIG. 8 is a schematic structural diagram of the printing electrode.

As shown in FIG. 8, an AC power surface 17A and a DC power source 17B are connected to the respective electrodes 15 via a connecting control section 19. The connecting control section 19 is formed by a plurality of switches which are switches 21A, ones of ends of which are connected to the electrodes 15 and the others of ends of which are connected to the AC power source 17A, and switches 21B, ones of ends of which are connected to the electrodes 15 and the others of ends of which are connected to the DC power source 17B.

The switches are controlled on and off by a control section 60, so as to electrically connect the electrodes 15, and the AC power source 17A and the DC power source 17B. In this way, AC voltage or DC voltage, or voltage on which AC voltage and DC voltage are superimposed, can be applied.

Next, operation of the present third embodiment will be described.

First, the image display medium 10 is conveyed by an unillustrated conveying means in the direction of arrow B in FIG. 6. When the image display medium 10 is conveyed to between the printing electrode 11 and the opposing electrode 26, the control section 60 instructs the connecting control section 19 to turn all of the switches 21A on. AC voltage is thereby applied from the AC power source 17A to all of the electrodes 15.

Here, the image display medium is a medium in which two or more types of particles groups are filled in the space between a pair of substrates which do not have electrodes.

When AC voltage is applied to the electrodes 15, the black particles 18 and the white particles 20 within the image display medium 10 move reciprocally between the display substrate 14 and the non-display substrate 16. In this way, the black particles 18 and the white particles 20 are frictionally charged due to the friction between the particles and the friction between the substrates and the particles. For example, the black particles 18 are charged positive, and the white particles 20 are not charged or are charged negative. Hereinafter, description will be given assuming that the white particles 20 are charged negative.

Then, the control section 60 instructs the connecting control section 19 to turn on only the switches 17B which correspond to the electrodes 15 at positions corresponding to the image data, such that DC voltage is applied to the electrodes 15 at the positions corresponding to the image data. For example, DC voltage is applied to the non-image portions, and DC voltage is not applied to the image portions.

In this way, when DC voltage is applied to the electrodes 15, as shown in FIG. 6, the black particles 18, which were charged positive and were at the portion where the printing electrode 11 opposed the display substrate 14, move toward the non-display substrate 16 due to the working of the electric field. Moreover, the white particles 20, which were charged negative and were at the non-display substrate 16 side, move toward the display substrate 14 due to the working of the electric field. Accordingly, because only the white particles 20 appear at the display substrate 14 side, no image is displayed at the portions corresponding to the non-image portions.

On the other hand, when DC voltage is not applied to the electrodes 15, the black particles 18, which were charged positive and were at the portion were the printing electrode 11 opposed the display substrate 14, are maintained as is at the display substrate 14 side due to the working of the electrode field. Moreover, the black particles 18, which were charged positive and were at the non-display substrate 16 side, move toward the display substrate 14 side due to the working of the electric field. Accordingly, because only the black particles 18 appear at the display substrate 14 side, an image is displayed at the portions corresponding to the image portions.

In this way, because only the black particles 18 appear at the display substrate 14 side, an image is displayed at the portions corresponding to the image portions.

In this way, the black particles 18 and the white particles 20 move in accordance with the image, and the image is displayed at the display substrate 14 side. Note that, if the white particles 20 are not charged, only the black particles 18 move due to the effect of the electric field. Because the black particles 18 at the regions where no image is displayed move toward the non-display substrate 16 and are concealed from the display substrate 14 side by the white particles 20, the image can be displayed. Further, even after the electric field which was generated between the substrates of the image display medium 10 disappears, the displayed image is maintained due to the inherent adhesion of the particles. Further, if an electric field is generated between the substrates, these particles can move again. Therefore, images can repeatedly be displayed by the image forming device 12.

In this way, because the charged particles are moved by an electric field with air serving as the medium, the stability is good. Moreover, because air has low viscous resistance, the high-speed response property is satisfactory.

Fourth Embodiment

Hereinafter, a fourth embodiment of the present invention will be described with reference to the drawings. The fourth embodiment is an image forming device using an electrostatic latent image carrier.

Figure 9:
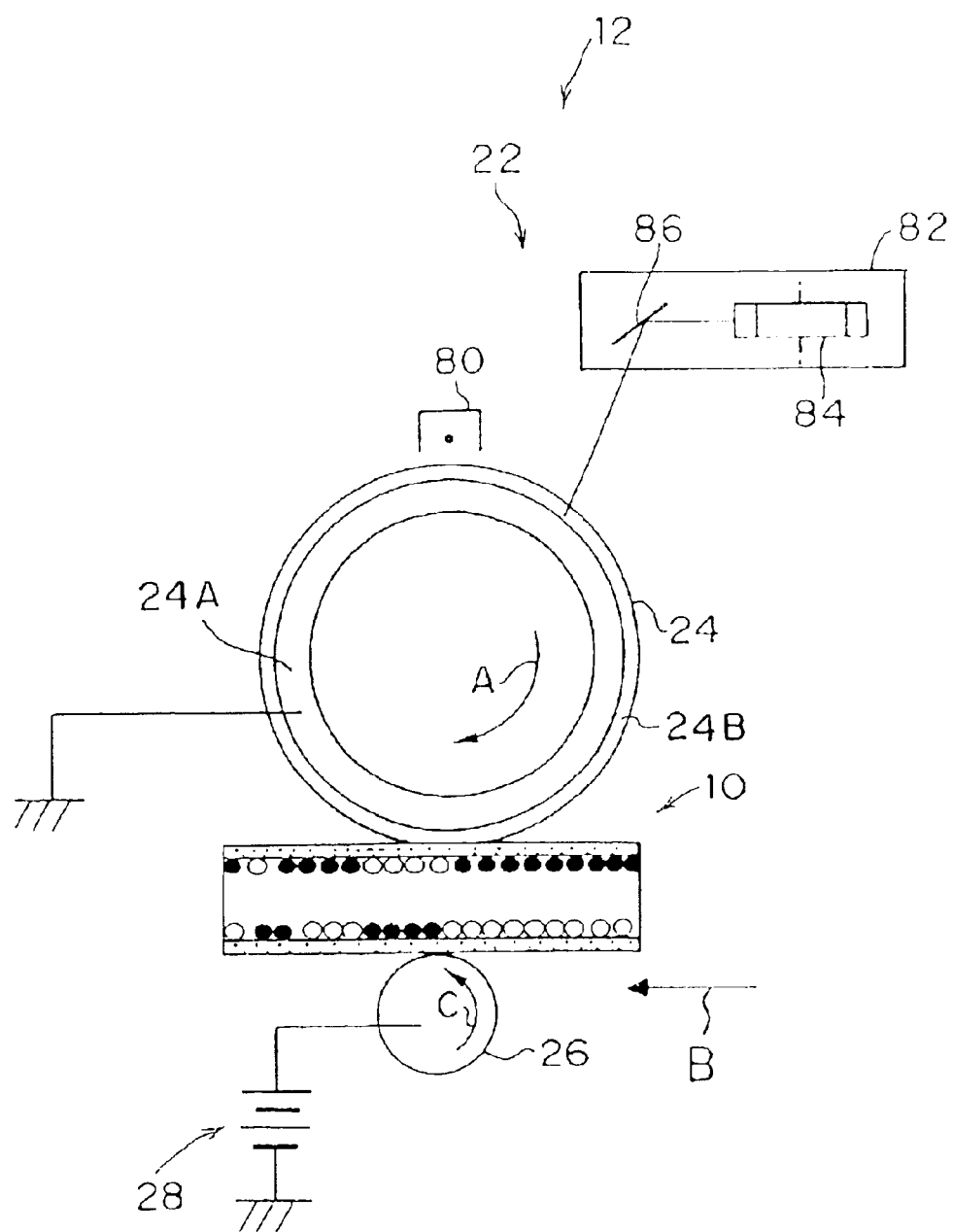
FIG. 9 is a schematic structural diagram of an image forming device of a fourth embodiment.

The image forming device 12 of the present fourth embodiment is illustrated in FIG. 9. The image forming device 12 is equipped with an electrostatic latent image forming section 22, a drum-shaped electrostatic latent image carrier 24, the opposing electrode 26, the DC voltage power source 28, and the like.

The electrostatic latent image forming section 22 has a charging device 80 and a light beam scanning device 82. The photosensitive drum 24 can be used as the electrostatic latent image carrier 24. The photosensitive drum 24 is a structure in which a photoconductive layer 24B is formed on a conductive substrate 24A which is drum-shaped and is formed of aluminum, SUS, or the like. Any of known materials an be used as the material of the photoconductive layer. For example, inorganic photoconductive materials such as $\alpha$-Si, $\alpha$-Se, $As_2Se_3$ and the like, and organic photoconductive materials such as PVK/TNF and the like can be used. These materials can be used to form the photoconductive layer 24B by plasma CVD, vapor deposition, dipping, or the like. As needed, a charge transporting layer or an overcoat layer or the like may be formed.

The charging device 80 uniformly charges the surface of the electrostatic latent image carrier 24 to a desired electric potential. It suffices for the charging device 80 to charge the surface of the photosensitive drum 24 to an arbitrary electric potential. In the present embodiment, as the charging device 80, a corotron is used which applies high voltage to an electrode wire, generates corona discharge between the electrode wire and the electrostatic latent image carrier 24, and uniformly charges the surface of the photosensitive drum 24. In addition, any of various types of known charging devices may be used such as devices which make conductive roller members, brushes, film members or the like contact the photosensitive drum 24, apply voltage thereto, and charge the surface of the photosensitive drum, or the like.

The light beam scanning device 82 irradiates light in the form of an extremely small spot on the basis of an image signal onto the surface of the charged electrostatic latent image carrier 24, so as to form an electrostatic latent image on the electrostatic latent image carrier 24. It suffices that the light beam scanning device 82 is a structure which, in accordance with the image information, irradiates a light beam onto the surface of the photosensitive drum 24 and forms an electrostatic latent image on the photosensitive drum 24 which has been uniformly charged. In the present embodiment, the light beam scanning device 82 is an ROS (Raster Output Scanner) device which, by a focussing system having a polygon mirror 84, a bend-back mirror 86, an unillustrated light source, lens, and the like, scans light onto the surface of the photosensitive drum 24 by the polygon mirror 84 while turning the laser beam, which has been adjusted to a predetermined spot diameter, on and off in accordance with the image signal. Other than the ROS device, an LED head, in which LEDs are aligned in accordance with the desired resolution, or the like may be used as the light beam scanning device 82.

Note that the conductive substrate 24A of the electrostatic latent image carrier 24 is grounded. Moreover, the electrostatic latent image carrier 24 rotates in the direction of arrow A in FIG. 9.

Figure 10:
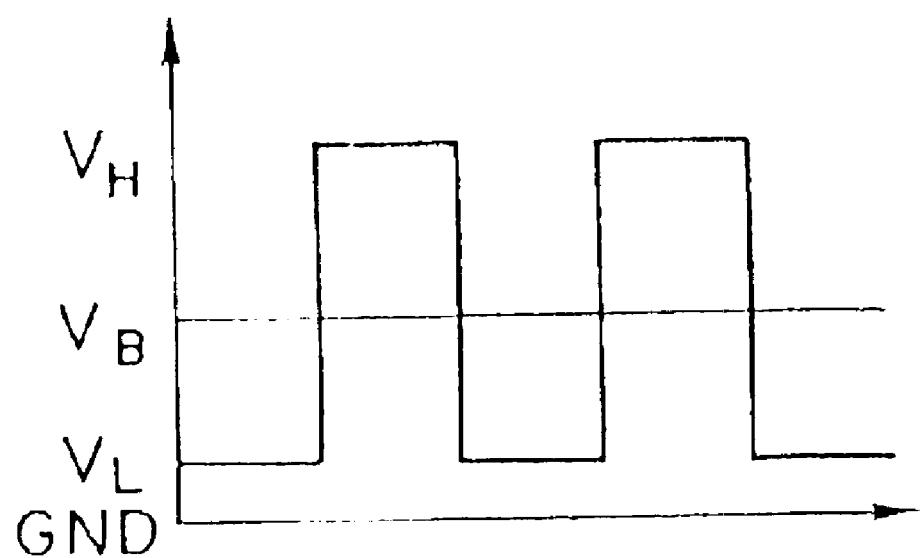
FIG. 10 is a graph showing electric potentials at an electrostatic latent image carrier and an opposing electrode.

The opposing electrode 26 is formed by, for example, a conductive roller member which is elastic. In this way, the opposing electrode 26 can be set in even closer contact with the image display medium 10. The opposing electrode 26 is disposed at a position which is at the side of the image display medium 10, which is being conveyed by an unillustrated conveying means in the direction of arrow B in FIG. 9, opposite the side at which the electrostatic latent image carrier 24 is disposed. The DC voltage power source 28 is connected to the opposing electrode 26. Bias voltage VB is applied to the opposing electrode 26 by the DC voltage power source 28. This bias voltage VB which is applied is, for example, as shown in FIG. 10, an intermediate electric potential between VH, which is the electric potential of the portions on the electrostatic latent image carrier 24 which are charged with positive charges, and VL, which is the electric potential of the portions which are not charged. Further, the opposing electrode 26 rotates in the direction of arrow C.

Next, operation of the present fourth embodiment will be described.

When the electrostatic latent image carrier 24 begins to rotate in the direction of arrow A in FIG. 9, an electrostatic latent image is formed on the electrostatic latent image carrier 24 by the electrostatic latent image forming section 22. On the other hand, the image display medium 10 is conveyed in the direction of arrow B in FIG. 9 by the unillustrated conveying means, so as to be conveyed between the electrostatic latent image carrier 24 and the opposing electrode 26.

Here, the bias voltage VB shown in FIG. 10 is applied to the opposing electrode 26. The electric potential of the electrostatic latent image carrier 24 at the position opposing the opposing electrode 26 is VH. Thus, when the portion of the electrostatic latent image carrier 24 opposing the display substrate 14 is charged with positive charges (a non-image portion), and when the black particles 18 adhere to the portion of the display substrate 14 opposing the electrostatic latent image carrier 24, the black particles 18 which are charged positive move from the display substrate 14 side toward the non-display substrate 16 side and adhere to the non-display substrate 16. In this way, because only the white particles 20 appear at the display substrate 14 side, an image is not displayed at the portion corresponding to the non-image portion.

On the other hand, when the portion of the electrostatic latent image carrier 24 which opposes the display substrate 14 is not charged with positive charges (an image portion), and when the black particles 18 adhere to the portion of the non-display substrate 16 opposing the opposing electrode 26, the electric potential of the electrostatic latent image carrier 24 at the position opposing the opposing electrode 26 is VL. Thus, the charged black particles 18 move from the non-display substrate 16 side toward the display substrate 14 side, and adhere to the display substrate 14. In this way, because only the black particles 18 appear at the display substrate 14 side, an image is displayed at the portion corresponding to the image portion.

In this way, the black particles 18 move in accordance with the image, and the image is displayed on the display substrate 14 side. Note that even after the electric field, which was generated between the substrates of the image display medium 10, disappears, the displayed image is maintained due to the inherent adhesion of the particles and the image force between the particles and the substrates. Further, if an electric field is generated between the substrates, the black particles 18 and the white particles 20 can again move, and therefore, images can repeatedly be displayed by the image forming device 12.

In this way, because bias voltage is applied to the opposing electrode 26, even if the black particles 18 are adhering to either of the display substrate 14 or the non-display substrate 16, the black particles 18 can be moved. Thus, there is no need to make the black particles 18 adhere in advance to one of the substrates. Further, an image which has high contrast and sharpness can be formed. In addition, because the charged particles are moved by the electric field with air being the medium, the stability is good. Moreover, because the viscous resistance of air is low, a satisfactory high-speed response property can be obtained.

Embodiments of the image forming device of the present invention utilizing the image display medium of the present invention have been described above with reference to the figures. However, the present invention is not limited to these embodiments, other than the fact that the above-described display particles are utilized, and can be structured as desired. Further, in the above description, black and white were used as the combination of the colors of the particles. However, the present invention is not limited to this combination, and the particles which have color can be appropriately selected as needed.

EXAMPLES

Hereinafter, the present invention will be described more concretely with reference to Examples. However, it is to be noted that these Examples are not intended to limit the present invention. Note that, in the following Examples and Comparative Examples, the effects of the present invention are confirmed by utilizing the image display medium and the image forming device relating to the first embodiment in the above section "Embodiments of the Image Forming Device of the Present Invention" (i.e., the image display medium and the image forming device of the structure of FIG. 1), and by changing the structures of the white particles 20 and the black particles (or blue particles) 18. At this time, the size, materials, and the like of the respective members are the same as described in the above section "Embodiments of the Image Forming Device of the Present Invention".

(Preparation of White Particles—1)

Preparation of Dispersion Liquid A

The following composition was mixed together and subjected to ball mill grinding for 20 hours by 10 mmΦ zirconia balls so as to prepare dispersion liquid A.

<Composition>

| | |
|---|---|
| cyclohexyl methacrylate | 64 parts by mass |
| titanium oxide 1 (white pigment) (primary particle diameter 0.3 μm, TIPAQUE CR63 manufactured by Ishihara Sangyo Kaisha, Ltd.) | 25 parts by mass |
| polymer particles (primary particle diameter 0.3 μm, SX866 (A) manufactured by JSR) | 10 parts by mass |
| charge controlling agent (COPY CHARGE PSY VP2038 manufactured by Clariant Japan) | 1 part by mass |

Preparation of Dispersion Liquid B

The following composition was mixed together and finely ground in a ball mill in the same way as dispersion liquid A, so as to prepare dispersion liquid B.

<Composition>

| | |
|---|---|
| calcium carbonate | 40 parts by mass |
| water | 60 parts by mass |

Preparation of Mixed Liquid C

The following composition was mixed together, deaerated for 10 minutes by an ultrasonic device, and then stirred by an emulsifier so as to prepare mixed liquid C.

<Composition>

| | |
|---|---|
| 2% cellogen aqueous solution | 4.3 g |
| dispersion liquid B | 8.5 g |
| 20% saline solution | 50 g |

35 g of dispersion liquid A, 1 g of divinylbenzene, and 0.35 g of polymerization initiator AIBN were measured out and sufficiently mixed together, and the mixture was deaerated for 10 minutes in an ultrasonic device. This mixed liquid was added into above mixed liquid C, and the mixture was emulsified in an emulsifier. Next, the emulsified liquid was placed in a bottle which was then plugged with a silicone stopper. Using an injection needle, the interior of the bottle was sufficiently deaerated and the pressure thereof reduced, and nitrogen gas was filled in. Then, a reaction was carried out for 10 hours at 70° C. such that particles were obtained. The obtained particulate powder was dispersed in ion-exchanged water, and the calcium carbonate was dissolved with hydrochloric acid water, and the mixture was filtered. Thereafter, sufficient washing with distilled water was carried out, and the particle size was made uniform by sieving through nylon sieves having apertures of 20 μm and 25 μm. The particles were dried, and white particles—1 (particles for a display device of the present invention) having an average particle diameter of 22 μm were obtained.

(Preparation of White Particles—2)

White particles—2 (particles for a display device of the present invention) were prepared in the same way as the preparation of the white particles—1, except that following dispersion liquid A' was used in place of dispersion liquid A. The average particle diameter of the obtained white particles—2 2 was 22 μm.

Preparation of Dispersion Liquid A'

The following composition was mixed together and subjected to ball mill grinding for 20 hours by 10 mmΦ zirconia balls, so as to prepare dispersion liquid A'.

<Composition>

| | |
|---|---|
| cyclohexyl methacrylate | 64 parts by mass |
| titanium oxide 1 (white pigment) (primary particle diameter 0.3 μm, TIPAQUE CR63 manufactured by Ishihara Sangyo Kaisha, Ltd.) | 25 parts by mass |
| titanium oxide 2 (white pigment) (primary particle diameter 0.8 μm, STT-30 EHJ manufactured by Titan Kogyo) | 5 parts by mass |
| polymer particle (hollow particles) (primary particle diameter 0.3 μm, SX866 (A) manufactured by JSR) | 5 parts by mass |
| charge controlling agent (BONTRON E89 manufactured by Orient Chemical Industries, Ltd.) | 1 part by mass |

(Preparation of White Particles—3)

White particles—3 were prepared in the same way as the preparation of the white particles—2, except that following dispersion liquid A" was used in place of dispersion liquid A'. The average particle diameter of the obtained white particles—3 was 21 μm. Further, the specific gravity of the obtained white particles—3 was about 1.3 times that of white particles—1, and about 1.2 times that of white particles—2.

Preparation of Dispersion Liquid A"

The following composition was mixed together and subjected to ball mill grinding for 20 hours by 10 mmΦ zirconia balls, so as to prepare dispersion liquid A".

<Composition>

| | |
|---|---|
| cyclohexyl methacrylate | 55 parts by mass |
| titanium oxide 1 (white pigment) (primary particle diameter 0.3 μm, TIPAQUE CR63 manufactured by Ishihara Sangyo Kaisha, Ltd.) | 44 parts by mass |
| charge controlling agent (COPY CHARGE PSY VP2038 manufactured by Clariant Japan) | 1 part by mass |

(Preparation of Black Particles—1)

Black particles—1 were prepared in the same way as the preparation of the white particles—1, except that following dispersion liquid K was used in place of dispersion liquid A. The average particle diameter of the obtained black particles—1 was 23.2 μm.

Preparation of Dispersion Liquid K

The following composition was mixed together and subjected to ball mill grinding for 20 hours by 10 mmΦ zirconia balls, so as to prepare dispersion liquid K.

| <Composition> | |
|---|---|
| methyl methacrylate | 81 parts by mass |
| diethylamino ethylmethacrylate | 4 parts by mass |
| carbon black graft polymer (CX-GLF-0215S manufactured by Nippon Shokubai Co., Ltd.) | 15 parts by mass |

(Preparation of Black Particles—2)

Black particles—2 (particles for a display device of the present invention) were prepared in the same way as the preparation of the white particles—1, except that following dispersion liquid K' was used in place of dispersion liquid A. The average particle diameter of the obtained black particles—2 was 22.5 μm.

Preparation of Dispersion Liquid K'

The following composition was mixed together and subjected to ball mill grinding for 20 hours by 10 mmΦ zirconia balls, so as to prepare dispersion liquid K'.

| <Composition> | |
|---|---|
| methyl methacrylate | 71 parts by mass |
| diethylamino ethylmethacrylate | 4 parts by mass |
| titanium black (black pigment) | 15 parts by mass |
| polymer particulates (primary particle diameter 3.0 μm, SX8703 (A)-02 manufactured by JSR) | 10 parts by mass |

(Preparation of Blue Particles—1)

Blue particles—1 (particles for a display device of the present invention) were prepared in the same way as the preparation of the white particles—1, except that following dispersion liquid L was used in place of dispersion liquid A. The average particle diameter of the obtained blue particles—1 was 23 μm.

Preparation of Dispersion Liquid L

The following composition was mixed together and subjected to ball mill grinding for 40 hours by 10 mm∠ zirconia balls, so as to prepare dispersion liquid L.

| <Composition> | |
|---|---|
| methyl methacrylate monomer | 85 parts by mass |
| diethylamino ethylmethacrylate | 1 part by mass |
| Pigment Blue 15:3 (blue pigment) (Fastgen Blue 5375 manufactured by Dainippon Ink & Chemicals Inc.) | 4 parts by mass |
| polymer particles (primary particle diameter 3.0 μm, SX8703 (A)-02 manufactured by JSR) | 10 parts by mass |

(Preparation of Blue Particles—2)

Blue particles—2 (particles for a display device of the present invention) were prepared in the same way as the preparation of the blue particles—1, except that the blue pigment (Pigment Blue 15:3) in dispersion liquid L was replaced with a specific pigment of the present invention (Pigment Blue 15:6 (Cyanine Blue 5203 manufactured by Dainichiseika)). The average particle diameter of the obtained blue particles—2 was 14.91 μm. Further, it was confirmed, by measurement based on JIS K 5101, that the blue particles—2 had excellent light-resistance.

(Preparation of Blue Particles—3)

Blue particles—3 (particles for a display device of the present invention) were prepared in the same way as the preparation of the blue particles—1, except that the blue pigment (Pigment Blue 15:3) in dispersion liquid L was replaced with master batch pigment M1 obtained by the following manufacturing method. The average particle diameter of the obtained blue particles—3 was 13.60 μm. Further, it was confirmed, by measurement based on JIS K 5101, that the blue particles—3 had excellent light-resistance. Moreover, when a small amount of the blue particles—3 was observed under an optical microscope, it was observed that the master batch pigment M1 was dispersed uniformly.

Manufacture of Master Batch Pigment M1

30 parts of a specific pigment (Pigment Blue 15:6 (Cyanine Blue 5203 manufactured by Dainichiseika)) as a blue pigment, and 40 parts of a styrene/methyl methacrylate resin were mixed together with 30 parts of toluene, and the mixture was ground and dispersed by a circulating batch grinding system. An Apex Mill having a content volume of 1 liter (AM-1 manufactured by Kotobuki Engineering and Manufacturing Co., Ltd.) was used as the grinding/dispersing device. After the grinding processing was carried out for two hours, a pigment dispersed liquid was obtained. The conditions for the grinding/dispersing were as follows: the grinding medium was zirconia of a diameter of 2.0 mm, the rotational speed of the rotor was 1700 rpm, and the supply pressure was 1.0 to 1.3 kg/cm$^2$.

The solvent was evaporated from this pigment dispersed liquid, such that a pigment resin containing about 40% by mass of pigment solids was obtained. This pigment resin was then coarsely ground to obtain the master batch pigment M1.

(Preparation of Blue Particles—4)

Blue particles—4 (particles for a display device of the present invention) were prepared in the same way as the preparation of the blue particles—1, except that a master batch pigment M2 was prepared by replacing the blue pigment (Pigment Blue 15:6 (Cyanine Blue 5203 manufactured by Dainichiseika)) used in the preparation of blue particles—3 with Fastgen Blue EP-CF (manufactured by Dainippon Ink & Chemicals Inc.), and this master batch pigment M2 was used as the blue pigment in dispersion liquid L. The average particle diameter of the obtained blue particles—4 was 13.27 μm. Further, it was confirmed, by measurement based on JIS K 5101, that the blue particles—4 had excellent light-resistance. Moreover, when a small amount of the blue particles—4 was observed under an optical microscope, it was observed that the master batch pigment M2 was dispersed uniformly.

Examples 1 through 8, Comparative Example 1

White particles, black particles and blue particles were respectively mixed together in accordance with Table 1 to as to prepare display particles 1 through 9. These display particles 1 through 9 were filled into the void between substrates disposed to oppose one another (the display substrate 14 and the non-display substrate 16) in the image display medium relating to the previously-described first embodiment and the image forming device for forming an image on the image display medium. Image display media of Examples 1 through 8 and Comparative Example 1 were thereby prepared. At this time, the compounding ratio (based on the number of particles) of the white particles and the black particles or the blue particles was white particles:black particles or blue particles =2:1.

(Evaluation)

The following evaluations were carried out on the obtained image display media and image forming devices.

Driving Voltage

When DC voltage of 100 V is applied to the transparent electrode of the display substrate 14 of the above-described image display medium 10 in which is filled a predetermined amount of two types of particles which are the white particles 20 and the black particles (or blue particles) 18 mixed together in a mass ratio of 2:1, a portion of the white particles 20, which are at the non-display substrate 16 side and which are charged with a negative polarity, begin to move toward the display substrate 14 side due to the working of the electric field. When DC voltage (driving voltage) is applied, a large number of the white particles 20 move toward the display substrate 14 side such that the display density is substantially saturated. At this time, the black particles (or blue particles) 18 which are charged with a positive polarity move toward the non-display substrate 16 side. Thereafter, even when the voltage is made to be 0 V, the particles do not move on the display substrate, and there is no change in the display density. The DC voltage applied at this time is the driving voltage, and this driving voltage is shown in Table 1.

Long Term Stability of Image

As described above, by applying voltage between the display substrate 14 and the non-display substrate 16 and making a desired electric field work on the particle groups, the particles 18, 20 move between the display substrate 14 and the non-display substrate 16. By switching the polarity of the applied voltage, the particles 18, 20 move in different directions between the display substrate 14 and the non-display substrate 16. By repeatedly switching the polarity of the voltage, the particles 18, 20 move back and forth between the display substrate 14 and the non-display substrate 16. In this process, the particles 18 and the particles 20 are charged to respectively different polarities due to the collisions between the particles 18, 20, and the colliding of the particles 18, 20 and the display substrate 14 or the non-display substrate 16. The black particles (or the blue particles) 18 are charged to a positive polarity, and the white particles 20 are charged to a negative polarity. The particles 18, 20 move in respectively different directions in accordance with the electric field between the display substrate 14 and the non-display substrate 16. When the electric field is fixed to one direction, the respective particles 18, 20 adhere to the display substrate 14 or the non-display substrate 16, such that an image, which has high contrast, uniform high density, and no non-uniformity of the image, is displayed. The reflection densities of the respective images before and after switching of the polarity of the voltage in a case in which the switching of the polarity of the voltage was repeated for 5000 cycles in a one-second interval, and then repeated 3000 cycles in a 0.1 second interval to a total number of 8000 cycles, were measured, and were used to functionally evaluate the long-term stability of the image.

Here, the method of functionally evaluating the long-term stability of the image was carried out as follows. Five places within a 20 mm×20 mm patch of each of the respective images before and after the switching of the polarity of the voltage were measured by the density measuring device X-Rite 404. The average value of the reflection densities of the five places was computed for each image, and evaluations were made by comparing these average values. In the evaluation, if the difference between the average reflection density of the image before the polarity of the voltage was switched, and the average reflection density of the image after the polarity of the voltage was switched (i.e., the value of the fluctuation in the average reflection density) was ±0.05 or less, the long-term stability of the image was judged to be good.

TABLE 1

|  |  | white particles 20 | black or blue particles 18 | driving voltage | value of fluctuation of average reflection density |
|---|---|---|---|---|---|
| Ex. 1 | display particles 1 | white particles −1 | black particles −1 | 200 V | −0.03 |
| Ex. 2 | display particles 2 | white particles −2 | black particles −1 | 200 V | +0.03 |
| Ex. 3 | display particles 3 | white particles −1 | black particles −2 | 210 V | −0.02 |
| Ex. 4 | display particles 4 | white particles −2 | black particles −2 | 205 V | +0.04 |
| Ex. 5 | display particles 5 | white particles −1 | blue particles −1 | 200 V | +0.03 |
| Ex. 6 | display particles 6 | white particles −1 | blue particles −2 | 200 V | +0.03 |
| Ex. 7 | display particles 7 | white particles −1 | blue particles −3 | 200 V | +0.02 |
| Ex. 8 | display particles 8 | white particles −1 | blue particles −4 | 200 V | −0.04 |
| Comp. Ex. 1 | display particles 9 | white particles −3 | black particles −1 | 400 V | −0.10 |

From these results, it can be understood that, in Examples 1 and 2 which used, as the white particles 20, the white particles—1 and the white particles—2 which are particles for a display device of the present invention, the driving voltage was 200 V which was low. This driving voltage is a value which is about half of that of Comparative Example 1. Further, because the value of fluctuation of the average reflection density was smaller than the value used for judging the long-term stability to be good, it was clear that the long-term stability of the displayed image was good.

Further, in the same way as in Examples 1 and 2, good effects were also obtained in Examples 3 through 8 which utilized, as the white particles 20, the white particles—1 and the white particles —2 which are particles for a display device of the present invention, and which utilized, as the black particles or the blue particles 18, the black particles—2 or the blue particles—1 through 4 which are particles for a display device of the present invention.

On the other hand, in Comparative Example 1 which did not use the particles for a display device of the present invention as the display particles, the driving voltage was 400 V which was high, and it was clear that that a high driving voltage was needed to form the image. Further, the value of fluctuation of the average reflection density exceeded the value used for judging the long-term stability to be good, and it was thus clear that the long-term stability of the displayed image was poor.

The same effects were also obtained when the above-described Examples and Comparative Example were applied to the image display media and the image forming devices relating to the second through fourth embodiments as well.

As described above, in accordance with the present invention, there are provided particles for a display device in which the cohesive force between the particles is reduced and whose specific gravity is reduced. Moreover, in accordance with the present invention, there are provided an image display medium whose driving voltage can be set low, and which can ensure a stable displayed image over a long period of time even if there are shocks from the exterior or static states for long periods of time, and an image forming device using this image display medium.

What is claimed is:

1. Particles for use in a display device, wherein the particles are filled in, and movable, between a pair of substrates disposed so as to face one another in a display device, the particles comprising polymer particulate, a color material and a resin, and having a property of being able to be charged one of positive and negative, wherein the charged particles are moved by an electric field with air serving as a medium.

2. An image display medium, comprising:

a pair of substrates disposed so as to oppose each other and form a void, and particle groups formed from at least two types of particles filled into, and movable within, the void between the pair of substrates, and at least one type of said at least two types of particles has a property of being able to be charged positive and at least one other type of said at least two types of particles has a property of being able to be charged negative, and the particles which are able to be charged positive and the particles which are able to be charged negative have respectively different colors, wherein at least one of the particles which are able to be charged positive and at least one of the particles which are able to be charged negative are particles for a display device comprising polymer particulate, a color material and a resin, and the charged particles are moved by an electric field with air serving as a medium.

3. An image forming device forming an image on an image display medium, comprising:

a pair of substrates disposed so as to face each other, and particle groups formed from at least two types of particles filled into, and movable within, a void between the pair of substrates, and at least one type of said at least two types of particles has a property of being able to be charged positive and at least one other type of said at least two types of particles has a property of being able to be charged negative, and the particles which are able to be charged positive and the particles which are able to be charged negative have respectively different colors, and at least one of the particles which are able to be charged positive and the particles which are able to be charged negative are particles for a display device comprising polymer particulate, a color material and a resin; and electric field generating means for generating an electric field corresponding to an image between the pair of substrates, wherein the charged particles are moved by the electric field with air serving as a medium.

* * * * *